Reissued Sept. 25, 1934 Re. 19,325

UNITED STATES PATENT OFFICE 19,325

METHOD OF TREATING FIBROUS MATERIAL

Leo A. Goodman, Brooklyn, N. Y.

No Drawing. Original No. 1,829,702, dated October 27, 1931, Serial No. 442,443, April 7, 1930. Application for reissue October 4, 1933, Serial No. 692,123

37 Claims. (Cl. 17—45)

The present invention relates generally to the treatment of vegetable fibrous material with a soluble cellulose derivative, and has particular reference to a method which involves the treatment of said material with a soluble cellulose derivative which is subsequently converted into an insoluble cellulose deposition upon a fibrous base. The fibrous base is a matted, felted or otherwise constituted aggregate of vegetable fibres having certain desirable characteristics and properties present in "Japanese tissue paper" of the kind commonly prepared from the fibres of the oriental plants mitzumata, kodzu and gampi, but which may be found in other vegetable fibres to varying degrees.

The method herein described may be employed to prepare materials which will serve several useful purposes of varying character. It has been found that the general method may be used to preserve, for indefinite periods, records which may be printed upon a fibrous base and protect the records from atmospheric and climatic changes and also prevent the destruction thereof by any reagents except those which have a solvent action upon the fibrous base or the cellulose. Another function of the present method and the one which at the present time is considered more important and useful is that of the production of a material which will afford an excellent and highly efficient substitute for the natural gut of animals, such as used for sausage casings.

This material simulates the properties of the natural gut, in appearance, tensile strength, elasticity, flexibility, pliability and porosity. It has also, like the natural gut, the unique properties of expansion when moistened and contraction when dried. This material is especially adaptable when formed into a container for the purpose of preparing bolognas, sausage or any other kind of food product for which the natural gut may be used, and has been found by the most exacting tests to be especially practical where smoking and boiling processes are followed. Furthermore, the material excels the natural gut because it is more sanitary and clean.

Many attempts have heretofore been made to produce an artificial casing simulating in appearance and qualities that of the natural gut, but these attempts have all proven unsuccessful for one reason or another. It is known that in the prior art the use has been made of what is known as cellulose hydrate for producing a casing which has its cellular structure entirely destroyed to render it non-fibrous. However, exhaustive experiments have shown that a practical and workable casing cannot be made under this process mainly for the reason that, without a fibrous base, the material, when formed into a tubular container, would not withstand the rigorous tests to which it must be subjected when filled with meats by means of compressed air, steam, or hydraulic pressure. The impracticability of this casing lies largely in the fact that it loses most of its tensile strength when damp or wet. Because of this characteristic, even if, by taking great precautions to keep the casing dry, the tendency to burst could be lessened during the filling process, still the wet meat, which would necessarily wet the casing would have a tendency to weaken it sufficiently to cause it to fall from the racks during the smoking process. Also, in the case of the non-fibrous material, any imperfections, such as small holes or tears in the casing, will render the casing useless for filling purposes. This is because any force exerted at the point of imperfection will cause a progressive enlargement of the hole or a progressive lengthening of the tear. On the other hand, the casing made under the new process, because of its fibrous base, has increased tensile strength even when wet. Further, it is because of this fibrous base that the further progress of any break or tear is retarded and its area restricted. The new casing will expand when wet and contract when dry and thus simulates certain desirable characteristics inherent in the natural gut casing. Because of these various essential characteristics the meat in the container adheres to the inner surface from the beginning of the treatment until the end for the reason that if the meat content should dry and shrink or dampen and expand the casing will do likewise in a uniform and satisfactory manner.

The resultant product of this new method is prepared under aseptic conditions, will not putresce or decompose, and has been found, by the most exacting tests, to be especially useful when prepared in the form of a tubular container for foods intended for human consumption, although it will be understood, of course, that the material may be utilized as a container for receiving and preserving substances of a non-edible nature, or, in fact, wherever a container or material with properties of natural gut is required.

It has been customary, in the manufacture of bolognas and the like, to imprint a suitable stamp upon the exterior surface of the natural gut container, after filling, or to attach a printed identification tag at one end of the filled container. This practice has led to much deceit and fraud as it is a relatively easy matter for unscrupulous dealers to alter or change an identification mark.

This objection may be overcome by the present method, for the material produced thereby is a synthetic product and it has been discovered that an imprintation with ink or the like may be made upon the fibrous base and beneath the outer layers or surfaces of the finished product, which imprintation will be as permanent as the material itself.

One of the essential features of the present invention is the treatment of a vegetable fibrous base with a soluble cellulose, such as a suitable ester or ether, a solution of either of which may be prepared by dissolving in non-alkaline or inert organic solvents, or other suitable solvents. After the base has been treated with the cellulose derivative, it is subsequently subjected to a suitable chemical treatment resulting in the partial or complete precipitation or regeneration of cellulose to form a partly soluble and insoluble or completely insoluble cellulose deposition upon the fibrous base.

Before entering into a description of the various steps involved in the present method, it is desired to set forth at some length what is understood to be the meaning of the terms "cellulose", "soluble cellulose", and "insoluble cellulose". According to the most recent scientific understanding, the general term "cellulose" means a colloidal material forming the framework of all vegetable cells. It has the same empirical formula $(C_6H_{10}O_5)n$ as starch and like the latter belongs to the general class of organic bodies known as carbohydrates. Like starch, it may be hydrolyzed, though more slowly, to glucose, but, unlike starch, cellulose occurs as fibres instead of granules, is substantially unaffected by boiling water and is not stained by iodine. P. Klason (Svensk Papers, Tid. 27, 261-4, 1924) suggests that cellulose be defined as a carbohydrate which at 98° C. is not soluble in a digesting acid containing 13 grams of wholly free $SO_2$ per liter.

The formation of a soluble cellulose body may be brought about by the resolution of any cellulose material by one of two general methods, to wit: (1) by the dispersion of the cellulose through liquid solutions of special chemical reagents, and (2) by the bringing into solution cellulose esters or ethers by means of suitable solvents.

By pursuing the first general method, the following chemical reagents have been found to bring about the desired results:—Schweitzer's reagent, $Cu\text{-}NH_4$ method; a 40% solution of $ZnCl_2$ at 60° C.; a HCl solution of Zn in the cold; HCl solutions of $SbCl_3$ (concentrated), $SbCl_5$, $BiCl_3$, and $TiCl_4$; also acid solutions of $CaCl_2$, $BaCl_2$, LiCl, $CaBr_2$, LiBr and $MgBr_2$; also hot solutions of thiocyanates (sulfocyanides) as Ca thiocyanate. The exact mechanism of bringing the cellulose into solution is not very well understood. It is claimed, however, that whenever the chemical action is allowed to proceed to a point beyond which there is a degradation of the cellulose molecule, the colloidal power of the solution is diminished and, of course, whenever there is a degradation of the molecule it will be impossible to regenerate the original cellulose molecule when the reagents causing the dispersion are removed.

It has been found that, by the union of cellulose with acid or alcohol radicals forming esters and ethers, if care is taken to avoid degradation of the cellulose molecule, there is no diminishing of the colloidal power of the original cellulose and that substantially unmodified cellulose may be regenerated. These esters and ethers are soluble in a great number of organic liquids as ketones, esters, phenols, cyclic alcohols, and binary and ternary mixtures of non-solvents. The viscosity varies with the kind and nature of ester, the kind, nature and amount of the plasticizer used with the ester, the physical constants of the solvent or solvent combination, the time and temperature, and whether the viscosity has been artifically diminished. An unmodified cellulose gives a more viscous solution.

The term "insoluble cellulose", as used in the present invention, is employed to indicate the regenerated or recovered cellulose which may be obtained in the case of the first-mentioned method, by the precipitation or the removal of the chemicals causing dispersion, or, in the second method, by the hydrolysis of the ester or the decomposition of the ether. It should be mentioned, however, that the first method would not in general be applicable to this invention, primarily because the same chemicals which cause the dispersion of the cellulose in solution would probably have some dispersive action on the cellulose in the fibre, thereby weakening it. It has been found by experiment, that the especially suitable soluble cellulose derivatives are those obtained by the solution of a cellulose ester or ether in organic solvents which are inert or have no chemical action on the structure of the cellulose molecule. It has also been found that even water has a tendency to soften and disintegrate the matted structure of the fibrous base.

Broadly, the materal produced by the present invention may be prepared by first impregnating a vegetable fibrous structure with a suitable soluble cellulose derivative and then, by suitable methods, rendering the soluble derivative insoluble. The impregnated fibrous structure may be formed either by impregnating flat sheets of fibrous material, or else by mixing the fibres, in pulp form, with the soluble cellulose derivative. More specifically, the vegetable fibre used in the present invention is preferably of the character commonly employed in the manufacture of "Japanese tissue paper", as the fibres of the oriental plants mitzumata, kodzu, or gampi, or other similar plants. Papers made of the fibres of these plants have been found especially suitable for carrying out the invention because of their ability to absorb and form a unitary appearing body with the soluble cellulose derivatives and after regeneration of the cellulose to form a strong homogeneous fabric. It will be understood, however, that any other fibres having similar characteristics may be employed without departing from the spirit or scope of the invention.

Soluble cellulose derivatives may be obtained in various ways, as indicated above. Especially suitable results will be obtained when "normal" or "cotton" cellulose is used.

In carrying out the invention, the cellulose derivative used may preferably be cellulose acetate. This ester is prepared from purified cotton. The ester is itself non-toxic and non-inflammable and is brought into solution in the manner indicated below. None of the chemicals or materials used in the present method are toxic or injurious to health and the final resulting product comprising fibrous material, cellulose, or any other suitable finishing agent is not only non-toxic but edible.

Several methods may be followed in obtaining a container for receiving meats, but in any case it is essential that in the initial step the cellulose ester be intermingled with the fibrous material, for example:

(1) The fibrous material employed may be cut to suitable dimensions and then the cut sheets are formed into cylindrical tubes by sealing the longitudinal edges with a suitable adhesive, or by sewing, or otherwise.

(2) The fibrous material may be impregnated first and the tubes formed afterwards.

(3) The film of cellulose acetate may in suitable manner be attached to the fibrous material prior to the formation of a tube; or (4) It is within the scope of the invention that material be first reduced to pulp and mixed with the proper solution of cellulose acetate and the whole finally cast into a suitable mold and shaped to form a tube or otherwise manipulated.

If it is desired to make indestructible imprintations, suitable imprints may be made either on the fibrous material prior to impregnation, or under certain conditions it may be produced after the impregnated cellulose acetate has dried, but prior to subjecting the ester to further treatments. In this connection, it is pointed out that, if the method is to be employed for the preservation of written or printed records, as previously suggested, the imprintations are preferably made on the flat sheets and the formation of the sheets into tubes is then an unnecessary step in the operation.

Irrespective of the particular method employed, the ultimate object is to obtain a substantially cylindrical tube of the fibrous base impregnated with the soluble cellulose derivative. The resulting impregnation should give a translucent, non-porous material practically unaffected by hot or cold water. Especially satisfactory results are attained by dissolving the acetate in proper solvents and plasticizers until the desired viscosity and other desired physical characteristics are obtained. In order to save the labor of tying off one end of the tube with twine, the resulting impregnated fibrous cylindrical tube may be constricted or closed at one end by first softening it with a suitable solvent and then twisting it until a closed nipple form is produced at this end. The end is then permitted to again dry, thus forming a solid body which does not become untwisted.

After completely drying the impregnated material by allowing the volatile solvents to evaporate, the tube, with or without the form of closure just described, is then subjected to the treatment by a sufficiently concentrated alkali metal hydroxide as sodium hydroxide, dissolved in alcohol or other appropriate solvent, until the ester is substantially completely hydrolyzed, the cellulose remaining in a more or less modified form as an insoluble deposition upon the fibrous structural base, rendering the resultant material porous and capable of contracting and expanding without rupture.

After removing the alkali the container may be treated with various liquids, such as non-toxic alcohol, paraffin hydrocarbons, edible oils and fats, or any agent which will aid in imparting a greater transparency or better finish to the product.

What is claimed is:—

1. The method of treating a fibrous base prepared from mitzumata, kodzu, gampi or other similar plants, which comprises impregnating the base with a soluble cellulose derivative, a solution of which is prepared by dissolving in inert organic solvents, and then substantially or completely regenerating the cellulose in a hydrated condition as an insoluble deposition upon the fibrous base.

2. The method of treating a fibrous base prepared from mitzumata, kodzu, gampi or other similar plants, which comprises impregnating the base with a solution of cellulose acetate, and then subjecting the impregnation to the action of an alkaline solution to substantially or completely regenerate the cellulose as an insoluble deposition upon the fibrous base.

3. The method of treating a fibrous base prepared from mitzumata, kodzu, gampi or other similar plants, which comprises impregnating a base with a solution of cellulose acetate prepared by dissolving the acetate and a suitable plasticizer with a mixture of inert organic solvents, and then subjecting the impregnation to an alkaline solution to substantially completely precipitate the hydrated cellulose as an insoluble layer upon the fibrous base.

4. The method of treating a fibrous base prepared from mitzumata, kodzu, gampi or other similar plants, which comprises impregnating the base with a solution of cellulose acetate, drying the impregnation, and then subjecting the impregnation to the action of an alkaline solution to regenerate the cellulose as an insoluble body upon the fibrous base.

5. The method of treating a fibrous base prepared from mitzumata, kodzu, gampi or other similar plants, which comprises making imprintations thereon, impregnating the fibrous base with a solution of cellulose acetate, and then subjecting the impregnation to the action of an alkaline solution to regenerate the cellulose as an insoluble deposition upon the fibrous base.

6. The method of producing a container for edible products, which comprises forming a sheet of fibrous material prepared from mitzumata, kodzu, gampi or other similar plants into a tube, impregnating said tube with a cellulose derivative, a solution of which is prepared by dissolving in solvents for the cellulose derivative, and then regenerating the cellulose as an insoluble deposition upon the fibrous base.

7. The method of producing a container for edible products, which comprises forming a sheet of fibrous material prepared from mitzumata, kodzu, gampi or other similar plants into a tube, making imprintations on said tube, impregnating said tube with a cellulose derivative, a solution of which is prepared by dissolving in inert organic solvents, and then regenerating the cellulose body as an insoluble deposition upon the fibrous base.

8. The method of producing a container for edible products, which comprises forming a sheet of vegetable fibrous material into a tube, impregnating said tube with a soluble cellulose derivative, a solution of which is prepared by dissolving in inert organic solvents, twisting the end of the tube to form a closure therefor, permitting the tube to dry, and then regenerating the cellulose as an insoluble body upon the fibrous base.

9. The method of producing a container for edible products, which comprises forming a sheet of vegetable fibrous material into a tube, impregnating said tube with a soluble cellulose ester, twisting the end of the tube to form a closure therefor, permitting the tube to dry, and then regenerating the cellulose as an insoluble deposition upon the fibrous base.

10. The method of producing a container for edible products, which comprises forming a sheet of vegetable fibrous material into a tube, impregnating the tube with a solution of cellulose acetate, twisting the end of the tube to form a closure therefor, permitting the tube to dry, and then subjecting the tube to the action of an alkaline solution to regenerate the cellulose as an insoluble deposition upon the fibrous base.

11. The method of producing a casing for meat products, which comprises forming a sheet of fibrous material prepared from mitzumata, kodzu, gampi or other similar plants into a tube, applying identifying marks upon said tube, impregnating said tube with a solution of cellulose ester, twisting the end of the tube to close it, drying the tube, and then regenerating the cellulose as an insoluble deposit upon the fibrous material.

12. The method of producing a fabric suitable for use as a covering for edible products, which comprises impregnating a sheet of fibrous material prepared from mitzumata, kodzu, gampi or other similar plants with a solution of cellulose acetate, drying said sheet, and regenerating the cellulose as an insoluble deposition upon said sheet.

13. The method of producing a casing suitable for use as a covering for edible products, which comprises impregnating a sheet of fibrous material prepared from mitzumata, kodzu, gampi or other similar plants with a solution of cellulose acetate and a suitable plasticizer to form a flexible transparent material unaffected by water.

14. The method of producing a fabric suitable for use as a covering for edible products, which comprises impregnating a sheet of fibrous material prepared from mitzumata, kodzu, gampi or other similar plants with a solution of cellulose acetate and a suitable plasticizer to form a flexible translucent material, and regenerating the cellulose as an insoluble deposition upon said base.

15. The method of producing a container for edible products, which comprises impregnating a sheet of vegetable fibrous material with a solution of a cellulose derivative in inert organic solvents, forming the sheet into a tube, said impregnating and forming being performed in either order, twisting one end of the tube to close the same, drying the impregnated tube, and then regenerating the cellulose as an insoluble deposit upon the fibrous base.

16. The method of producing a container for edible products, which comprises impregnating a sheet of vegetable fibrous material with a solution of cellulose acetate, forming the sheet into a tube, said impregnating and forming being performed in either order, twisting one end of the tube to close the same, drying the impregnated tube, and then regenerating the cellulose as an insoluble deposit upon the fibrous base.

17. As an article of manufacture, a casing for food products comprising a fibrous base prepared from mitzumata, kodzu, gampi or other similar plants and having thereon a deposit of regenerated cellulose prepared from de-esterified acetated cellulose.

18. As an article of manufacture, a casing for food products comprising a fibrous base prepared from mitzumata, kodzu, gampi or other similar plants and having thereon a deposit of regenerated cellulose obtained from de-esterified acetylated cellulose, upon which and in which is a permanent imprintation.

19. As an article of manufacture, a casing for food products comprising a branded fibrous base prepared from mitzumata, kodzu, gampi or other similar plants and having thereon a deposit of regenerated cellulose prepared from de-esterified acetated cellulose.

20. A method of producing a container for edible purposes containing no nitrogenous components comprising forming a sheet of vegetable fibrous material into substantially tubular form, impregnating said tube with cellulose acetate in solution in a non-aqueous solvent, de-esterifying the cellulose acetate by ways now known until substantially all of the acetic acid radical has been removed therefrom, finally treating the material in a paraffin hydrocarbon bath, substantially as herein set forth.

21. A method for producing a casing for meat products which is translucent and non-putrescible, comprising forming a sheet of fibrous material prepared from mitzumata, kodzu, gampi or other similar plants into a tubular structure, applying identifying marks upon said tube, impregnating the mass with cellulose acetate in solution, substantially de-esterifying the cellulose acetate to form an insoluble deposit as herein set forth.

22. The method of treating a sheet of matted, absorbent, vegetable fibres which comprises impregnating the sheet with a soluble cellulose derivative, a solution of which is prepared by dissolving in suitable solvents, allowing the volatile solvents to evaporate, and then substantially completely regenerating the cellulose as an insoluble deposition upon the fibrous base.

23. The method of producing a casing material which comprises impregnating a sheet of vegetable fibrous material with a solution of cellulose acetate and a suitable plasticizer to form a flexible transparent material unaffected by water.

24. The method of producing a container for edible products, which comprises impregnating a sheet of vegetable fibrous material with a soluble cellulose derivative, forming the material into a tube, making a closure at one end of the tube and then regenerating the cellulose as an insoluble deposition upon the fibrous base.

25. The method of producing a container for edible products, which comprises forming a sheet of vegetable fibrous material into a tube, impregnating said tube with a soluble cellulose derivative, drying the tube, and then regenerating the cellulose as an insoluble deposition upon the fibrous base.

26. The method of producing a container for edible products, which comprises impregnating a sheet of vegetable fibrous material with a soluble cellulose derivative, forming the sheet into a tube, and regenerating the cellulose derivative to form an insoluble deposition in and upon the fibrous structure.

27. The method of producing a synthetic gut having the properties of expanding when moistened and contracting when dried, which comprises impregnating a sheet of vegetable fibrous material with a solution of a cellulose derivative, and then substantially completely regenerating the cellulose to form an insoluble impregnation of regenerated cellulose in the fibrous structure.

28. The method of producing a synthetic gut having the properties of expanding when moistened and contracting when dried, which comprises treating a sheet of vegetable fibrous material with a solution of a cellulose derivative, and substantially completely regenerating the cellulose to form a homogeneous fabric comprising an insoluble deposition of regenerated cellulose upon the fibrous sheet.

29. A method of producing a material having the properties of a synthetic gut which comprises mixing vegetable fibres as such with a cellulose derivative, forming the mixture into a tube, then substantially completely regenerating the cellulose derivative to form a homogeneous uniform fabric of regenerated cellulose united with the fibres.

30. A method of producing a material having properties simulating those of a natural gut which comprises mixing vegetable fibres as such with a cellulose derivative, forming the mixture into a sheet and then substantially completely regenerating the cellulose derivative to form a homogeneous fabric of regenerated cellulose united with the fibres.

31. A method of producing a material having an ineradicable imprintation suitable for use as a covering for edible products which comprises impregnating a sheet of vegetable fibrous material with a cellulose derivative, applying identifying marks upon the dry impregnated material, and then regenerating the cellulose to form a homogeneous combination of fibre and regenerated cellulose.

32. A container for food products comprising a base of matted vegetable fibres impregnated with an insoluble regenerated cellulose.

33. A casing material for meat products comprising a base of matted cellulosic fibres impregnated and coated with an insoluble regenerated cellulose.

34. A casing material for meat products comprising a base of vegetable fibrous material impregnated with a regenerated cellulose, said material having the properties of expanding when moistened and contracting when dried.

35. A sausage casing comprising a tube of matted cellulosic fibres impregnated with a regenerated cellulose, said casing having the properties of expanding when moistened and contracting when dried.

36. A casing for food products comprising a base of vegetable fibrous material impregnated with regenerated cellulose having therein or thereon an ineradicable imprintation.

37. An article of manufacture, a material having properties simulating those of a natural gut, comprising a vegetable fibrous base impregnated with regenerated cellulose.

LEO A. GOODMAN.